Oct. 11, 1938.   W. V. DRAPER   2,133,085
TRANSITION OF SCENES ON A MOTION PICTURE FILM
Filed July 11, 1936
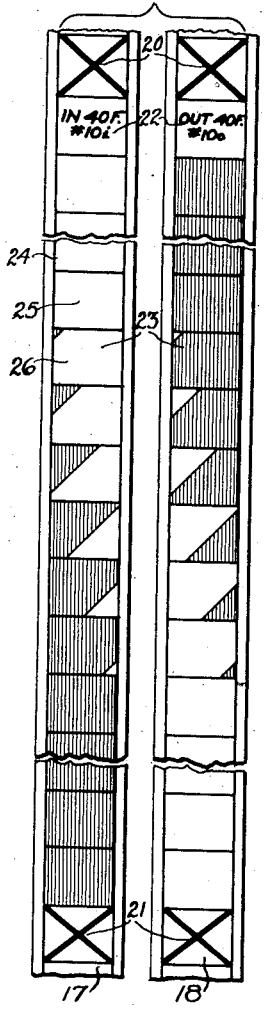
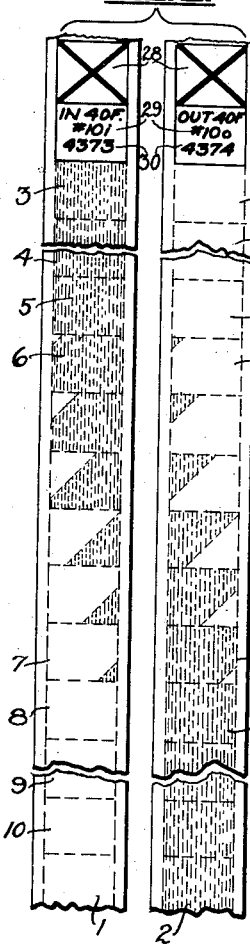
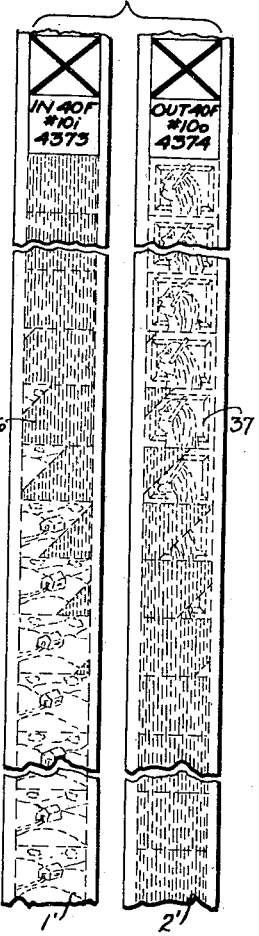
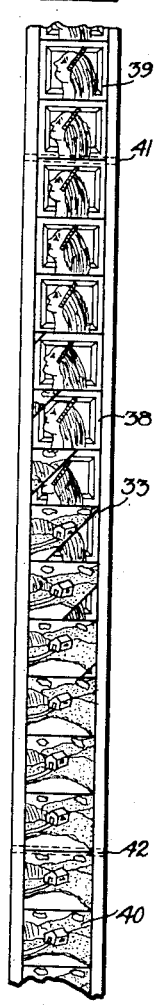
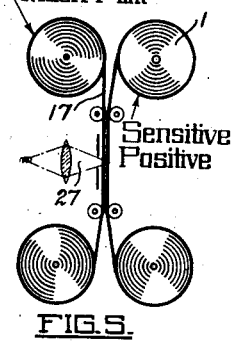
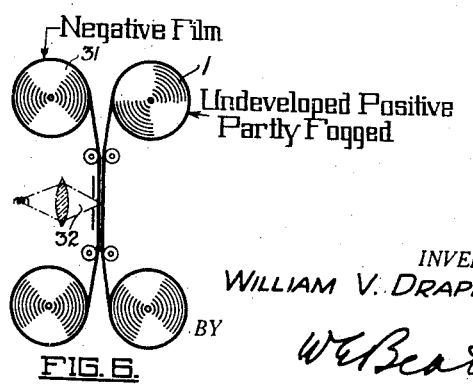
INVENTOR.
WILLIAM V. DRAPER
BY
W. E. Beatty
ATTORNEY.

Patented Oct. 11, 1938

2,133,085

UNITED STATES PATENT OFFICE 2,133,085

TRANSITION OF SCENES ON A MOTION PICTURE FILM

William V. Draper, Palms, Calif.

Application July 11, 1936, Serial No. 90,132

5 Claims. (Cl. 88—16)

This invention relates to photography and has particular reference to the production of a motion picture film showing a gradual change between two complete successive scenes thereon.

In the art of motion picture photography it is often desirable, in order to enhance certain dramatic incidents and to obviate eyestrain due to a sudden change between scenes, to show a gradual change or transition between two successive scenes on a motion picture film.

Two methods are commonly employed at present to produce this effect, and are known in the art as the "dissolve method" and the "wipe method".

In the "dissolve" method the scene being dissolved or faded out on the final positive film gradually decreases in density from a normal photographic density until the scene is entirely dissolved or faded out of view on the last photograph or frame of the film showing that scene. The scene being faded-in begins with substantially no density on one frame on the film and gradually increases in density on successive frames until a normal photographic density is reached. Generally, as in a "lap-dissolve" the scene being faded out overlaps the scene being faded in so that the transmission through the portion of the final positive film showing the transition does not vary greatly from the average photographic transmission.

The fading-out of a scene has heretofore been generally accomplished by gradually decreasing the shutter opening of the motion picture camera photographing the particular scene or by gradually decreasing the shutter opening of the optical printing camera when employing an optical film printer for producing a dissolve on a sensitized film from a developed constant average density film of the scene, or by gradually decreasing the amount of printing light admitted to the printing operation when employing either an optical or contact film printer for producing the dissolve during a printing operation, or by interposing between a developed film, having thereon the scene to be dissolved, and a sensitized film, a blank mask film of gradually increasing opacity toward one end thereof. The fading-in of the next successive scene on the film was accomplished by changing the shutter opening, or printer light intensity or mask film in a manner complementary to that employed in fading-out the preceding scene.

In the "wipe" method the areas of the successive frames of a film, which areas carry the images of a scene to be gradually passed or wiped out of view are successively and gradually varied from substantially a total frame area on one frame of the film to a substantially zero frame area in a subsequent film. If the film is to show a succeeding scene coming into view simultaneous with the wiping out of the previous scene, the images of the next succeeding scene are then printed into the progressively increasing blank spaces left on the series of successive aforementioned frames, so that when the frame on which substantially no image of the preceding scene is reached, the total area of the image of the latter scene will be printed thereon.

The passing-out of one scene has heretofore been generally accomplished in several ways, such as by producing a shadow of a shutter in the printing operation upon the sensitized film, or the printing film, and gradually causing this shadow to travel across the film while the picture is being printed upon the unobstructed portions thereof, or by interposing between the printer film and the sensitized film in the printing operation, a mask film having successively increasing areas of opacity on successive frames thereof, respectively. The passing-in of the next successive scene, of course, is accomplished in a manner complementary to that employed for the passing-out of the preceding scene.

In all of the foregoing methods the operation of successively changing the amount of density of the printing film or the area of image printing on successive frames thereof for the purpose of dissolving or wiping scenes into and out of view, has generally been accomplished simultaneously with the picture printing operation. Furthermore, the production of either dissolve or wipe films has been heretofore accomplished by blocking out a portion of or decreasing the intensity of the printing light.

One object of the present invention is to render portions of a photograph blank.

This is accomplished by light exposing or fogging in one operation the portions of a sensitized photographic surface, the corresponding portions of which on a resulting photograph are to be rendered blank, light impressing an image of a scene upon the photographic surface and printing the partly fogged and image impressed photograph upon a second photograph surface.

Another object of the invention is to prepare a motion picture film having a gradual dissolving or wiping effect of a scene thereon.

This is accomplished by fogging successive picture frames of a motion picture film with successively varying quantities of light, respectively, and in another operation photographically impressing upon the partly fogged frames of the undeveloped film the images of the scene to be dissolved or wiped into or out of view.

A still further object of the invention is to permit greater flexibility in the preparation of a motion picture film, having a gradual transition between successive scenes, than heretofore.

This is accomplished by fogging in a complementary manner the successive frames of two respective films so as to change successively the density or area of the fogged portion of the successive frames, photographically impressing in another operation upon the two partly fogged films the images of the two scenes, respectively, then developing the films and printing the corresponding complementary fogged frames of the two films upon each corresponding frame of a third film.

The invention is particularly applicable to the work of small commercial motion picture film studios, amateur photographers or others, who do not have available the relatively expensive and complicated equipment necessary to produce the various mask films, or who do not have the varying photographic light density arrangements found only on relatively expensive motion picture cameras. In this case the film or films may be first treated by a central laboratory having the facilities of exposing any desired succession of designs on successive frames of the films for the purpose of effecting, in a later operation, a dissolve or wipe of a scene. These films may later be placed, while still undeveloped, in a motion picture camera or simple printer and a resulting dissolve film obtained without the use of a mask film or special shutter arrangements.

Although it is preferable, in view of the particular applications as outlined above, to fog or expose the dissolve or wipe film previous to the photographing or printing thereon, it is to be understood that this fogging operation may be applied subsequent to the photographic or printing operation.

More particularly describing the invention, reference is had to the accompanying drawing wherein:

Fig. 1 shows a pair of complementary mask films adapted to be employed in light exposing, in a complementary manner, a pair of sensitized films in accordance with the present invention.

Fig. 2 shows a pair of sensitized films exposed, in a manner complementary to each other, as by the use of the mask films shown in Fig. 1.

Fig. 3 shows the undeveloped films of Fig. 2 after a subsequent operation, in which the latent images of the scenes to be wiped out of and into view are printed on the two films, respectively.

Fig. 4 shows a completed film with the successive frames of a portion thereof printed from the corresponding complementary frames of the films shown in Fig. 3, (after development).

Fig. 5 is a diagrammatic view of a printing apparatus showing the operation of light exposing successively varying portions of a sensitized film, by the use of a mask film, preferably prior to the printing of images of a scene thereon.

Fig. 6 is a diagrammatic view of the printing apparatus showing the operation of printing the partially fogged undeveloped films as shown in Fig. 3 from a printer film.

As shown in Fig. 2, I obtain, preferably in the first step of the process, a pair of complementarily fogged or light exposed undeveloped films 1 and 2. Film 1, which is to be employed for producing the wiping in or fading in of a successive scene, is totally exposed for the first few photograph frames as at 3, 4 and 5. The next successive series of frames from 6 to 7, inclusive, are exposed to successively decreasing quantities of light, until a frame 8 is reached whereon no light has been exposed. The next few succeeding frames as at 9 and 10, are also unexposed.

The sensitized film 2 is fogged in a complementary manner to that of 1 in that the first few frames 11, 12 and 13, corresponding in position to frames 3, 4 and 5 of film 1, are totally unexposed. The succeeding series of frames from 14 to 15, inclusive, corresponding in position to the series of frames 6 to 7 on film 1 are fogged or exposed in successively decreasing amounts, until a frame 16, corresponding to 8, is reached whereon the total area of that frame and each of the next succeeding frames is exposed. In the particular wiping effect shown in the illustration, the fogged portions of the series of frames from 14 to 15 correspond exactly in shape and size to the unfogged portions of the corresponding series of frames from 6 to 7 of film 1.

Any desired design may be employed for the successively varying areas or amounts of exposures on the successive frames of a film showing a transition of a scene or transition between two scenes. For example, instead of a straight line varying in position, the successive frames of the films of Fig. 2 may have impressed thereon a series of circular fogged areas gradually growing larger or smaller in size along the lengths of the films from a pinpoint to substantially the entire area of a subsequent frame or vice versa, respectively. If, instead of varying the area of exposure on the successive frames of the transition portion of the film it is desired to vary the density of the film to produce a lap-dissolve, the film showing the scene to be passed out of view may begin with 100% transmission and gradually decrease in transmission on succeeding frames thereof until a frame is reached where substantially zero transmission is provided. The film showing the scene to be passed into view will begin with substantially zero transmission and gradually increase in transmission in a manner complementary to the first mentioned film.

The fogging of progressively varying areas or degrees of density on succeeding frames of the two complementary films of Fig. 2 may be accomplished by means of the complementary mask films 17 and 18 shown in Fig. 1. Both of films 17 and 18 have starting and finishing marks 20 and 21 on corresponding frames thereof. Title frames 22 are provided on the two films 17 and 18, preferably on the frame next succeeding the starting marks 20. These title frames include all of the necessary data for identifying the particular mask film. For example, it may contain a number ($10_i$ or $10_o$) to designate the particular design of transition thereon, indicia (40F.) to indicate the total length, as in frames, included in the dissolve or wipe; and the words "in" or "out" to indicate the direction of transition, that is, whether the scene is to be passed into or out of view, respectively. Preferably the distance between the starting marks 20 and the beginning of the transition effect, as indicated by the frames 23, is a certain standard distance, for example, 5 ft. This information may also be included, if desired, in the title frame 22 in order to indicate to the printing operator the exact frame of the sensitized film upon which the transition effect begins or ends.

The exposing of varying areas or densities of the corresponding sensitized films 1 and 2 (Fig. 2) through the use of the mask films 17 and 18, may be accomplished either in an optical printer (not shown) or in a contact printer, as diagrammatically shown in Fig. 5. Here, one of the mask films 17 is passed in contact with a sensitized film which, in this case may be the film 1. This film 1 is shown as being of positive stock, however, it is to be understood that either positive or negative stock film may be employed for this operation. The mask film and the sensitized film 1 are passed in contact before a printing light 27 so as to expose on the film 1 the portions corresponding to the transparent frames and portions of frames of the mask film as at 24, 25, 26 etc.

As alternatives to the employment of mask films such as 17 and 18, the films 1 and 2 may be light exposed in varying amounts by gradually changing the printer light intensity as by a rheostat employed in the printing lamp circuit, by a gradually moving shutter employed in the path of the printing light beam and outside of the focal plane of the light beam, or by means of a shutter moving across the printing light beam in a plane substantially co-incident with the focal plane of the printer light beam.

Either after or before fogging the films 1 and 2, visible starting marks 28 are provided thereon, preferably corresponding in position to the starting marks 20 of the mask films 17 and 18 of Fig. 1 in order to assist in the correct positioning of the dissolve or wipe effect in a subsequent operation. These marks may be punched out, transfer printed, or provided on a tab secured to the film in any suitable manner. Preferably the same title information 29 is provided on the films 1 and 2 as appears on the mask films 17 and 18. In addition, however, a serial number 30 is preferably provided so as to differentiate between several films, if more than one set of films have thereon the same type of dissolve or wipe.

As shown in Fig. 6, the undeveloped film 1, after being partially fogged as in the manner indicated by Fig. 5, is passed through a second printing operation. Here the film 1 is placed in a printing apparatus in printing relation with a developed film 31 (preferably a negative) carrying thereon a scene which has been photographed without a dissolve or wipe effect thereon. The two films 1 and 31 are run in contact past a printing light 32 which light impresses upon the entire areas of each successive partially fogged frames of the undeveloped film 1 the images of the scenes provided on the corresponding frames of the developed negative 31. However, due to the fact that the film 1 has been previously fogged by varying quantities of light on successive frames thereof, the latent images upon this film 1 will actually be recorded only on the portions of the film which have not already been fogged or will be recorded by amounts substantially inversely proportional to the degree of previous fogging.

The resulting films 1' and 2' (Fig. 3), corresponding to the films 1 and 2, respectively, after having received on the unfogged portions thereof, the images of the scenes to be faded in and faded out, respectively, are developed in the usual manner and are printed in a subsequent operation on a single film 33. This may be accomplished by first printing upon the film 33 images of the developed film 1'. While in an undeveloped condition, the corresponding portions of film 2', are then printed upon the unprinted portions of the film 33. That is, each of the corresponding and complementary fogged frames, as at 36 and 37, of the two films 1' and 2' of Fig. 3, are printed in succession upon the same corresponding frame, as at 38, of the film 33.

As was stated hereinbefore, the films 1 and 2 may have printed thereon, either negative or positive images so as to produce either a final negative or final positive film 33. If the dissolving action is to be produced in a printing operation, it may be desirable to print positive images thereon from the original developed negatives, as 31, taken from the motion picture camera. The portions of the original negative or of original duped negatives as at 39 and 40 just previous and just subsequent to the corresponding transition portion of the film 33 may then be spliced as at 41 and 42 to the transition portion of the finished film 33.

In cases where it is desirable to produce the dissolving or wiping effect of a film during the photographing of a scene, such as may be advantageous in amateur photography, the original negative or negatives may be fogged in the manner explained for producing the films 1 and 2, and the original scene photographically impressed thereon by the camera (not shown). In this case the resulting printed film, similar to that of 33 or merely showing a view gradually passing into or out of view will be a positive film.

In the accompanying claims the words "varying characters of light" or "varying quantities of light" are meant to include either varying intensities of light or varying cross sectional areas of a beam of printing light.

Having thus described the invention, what is claimed as new and desired to be secured by Letters Patent is:

1. The method of making a transition between two scenes on a motion picture film which comprises the following steps: fogging successive frames of a sensitized film by an amount which progressively varies from frame to frame, fogging in a complementary manner successive frames of a second sensitized film; light impressing the image of one of said scenes on the partly fogged frames of one of said sensitized films; light impressing the other of said scenes on the partly fogged frames of the other of said sensitized films; developing both of said sensitized films thus fogged and light impressed, and printing on a third film the pairs of frames of said developed films having complementary fogging, with both frames of a pair on the same frame of said third film.

2. The method of making a transition between two scenes on a motion picture film which comprises fogging successive frames of a sensitized film with successively decreasing quantities of light from a substantially maximum amount on one frame to a substantially zero amount on another frame, fogging in a complementary manner successive frames of a second sensitized film, light impressing successive images of one of said scenes on the partly fogged frames of one of said films, light impressing successive images of the other of said scenes on the partly fogged frames of the other of said films, developing said sensitized films thus fogged and light impressed, and printing on a third film the pairs of frames of said developed films having complementary fogging, with both frames of a pair on the same frame of said third film.

3. The method of making a transition between two scenes on a motion picture film which comprises exposing successively increasing areas on successive frames of a sensitized film, respectively; exposing successively decreasing areas on successive frames of a second sensitized film in a complementary manner to said first mentioned film; light impressing the image of the scene to be passed out of view on said first partly exposed film; light impressing the image of the scene to be passed into view upon said second partly exposed film; developing said films; and printing the pairs of frames, of said developed films having said exposing complementary, on a third film with both frames of a pair on the same frame of said third film.

4. The method of producing a wipe between two scenes on a motion picture film which comprises light fogging successively increasing areas of successive frames of a sensitized positive film, respectively; light fogging in a complementary manner successive frames of a second sensitized positive film; light impressing upon the partly fogged frames of said first positive sensitized film the frames of a portion of a developed negative film carrying the image of the one of said scenes to be wiped out; light impressing on the partly fogged frames of said second positive sensitized film the frames of a portion of a second developed negative film carrying the image of the one of said scenes to be wiped in; developing said positive films thus fogged and light impressed; and printing on a third film the pairs of frames of said developed films having complementary fogging, with both frames of a pair on the same frame of said third film.

5. The method of making a lap dissolve between two scenes on a motion picture film which comprises fogging successive frames of a sensitized film with successively decreasing light intensities, respectively; fogging in a complementary manner successive frames of a second sensitized film; light impressing upon the fogged successive frames of said first sensitized film, the frames of a portion of a developed film carrying the image of the one of said scenes to be dissolved into view; light impressing on the fogged successive frames of said second sensitized film, the frames of a portion of a second developed film carrying the image of the one of said scenes to be dissolved out of view; developing said sensitized films thus fogged and light impressed and printing on a third film the pairs of frames of said developed films having complementary fogging, with both frames of a pair on the same frame of said third film.

WILLIAM V. DRAPER.